E. D. PRIEST.
DYNAMO ELECTRIC MACHINE.
APPLICATION FILED AUG. 12, 1910.

1,014,904.

Patented Jan. 16, 1912.

Witnesses:
Marcus L. Byng
J. Ellis Glen

Inventor:
Edward D. Priest,
by
His Attorney.

UNITED STATES PATENT OFFICE.

EDWARD D. PRIEST, OF SCHENECTADY, NEW YORK, ASSIGNOR TO GENERAL ELECTRIC COMPANY, A CORPORATION OF NEW YORK.

DYNAMO-ELECTRIC MACHINE.

1,014,904.  Specification of Letters Patent.  Patented Jan. 16, 1912.

Application filed August 12, 1910. Serial No. 576,926.

*To all whom it may concern:*

Be it known that I, EDWARD D. PRIEST, a citizen of the United States, residing at Schenectady, county of Schenectady, State of New York, have invented certain new and useful Improvements in Dynamo-Electric Machines, of which the following is a specification.

My invention relates to dynamo electric machines, and more particularly to means for supporting the field coils of such machines and has for its object a construction which holds the field coils securely in place and protects the field coils when the pole pieces are being placed in position.

The various features of novelty which characterize my invention are pointed out with particularity in the claims annexed to and forming a part of this specification.

For a full understanding of my invention, reference may be had to the following description taken in connection with the accompanying drawing, in which—

Figure 1:
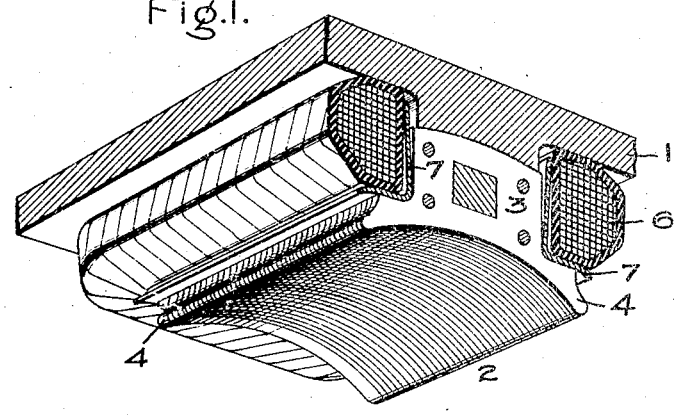
Figure 2:
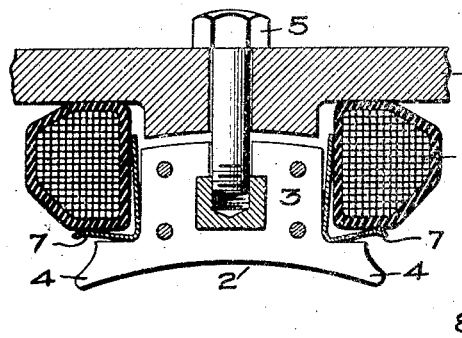
Figure 3:
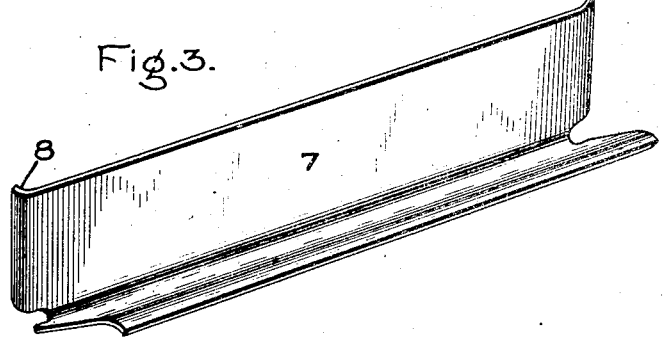

Figure 1 is a perspective view of a field coil mounted on a pole piece and held in place by my support, Fig. 2 is a sectional view of a field coil in the process of assembly with my support, and Fig. 3 is a perspective view of my support.

Referring to the drawing, 1 is the frame of a dynamo electric machine, to which field magnet poles 2 are fastened. Each of these poles has a main portion 3 and pole tips 4. I have shown these poles as being made of laminations riveted together and fastened to the frame by means of bolts 5. Field coils 6 surround the poles and are held in place by supports 7. The supports 7 are flanged plates, that is, they have two portions bent at an angle to each other, the angle being preferably less than 90 degrees. They are made of resilient material, such as tempered steel. One of these portions may have its ends bent, as shown at 8 in the drawing. I prefer to use two of these supports with each field coil. These supports are placed on the opposite sides of a coil 6 and then the pole 2 is inserted. These supports thus protect the coil during the process of assembly from any damage which the sharp corners of the pole might cause if they were not present. The pole is then drawn into place by the bolts 5. The portions of the support between the pole tips and the coil tend to press the coils toward the frame, and the portions of the support between the main part of the pole and coil tend to press the coil away from this part of the pole. It will thus be seen that these plates act as supports for the coil and keep it rigidly in place by forcing it against the frame and away from the sides of the poles. By bending the ends 8 of one portion of the supports they are prevented from any endwise motion which would tend to injure the coil. By bending these ends at an angle greater than 90 degrees, as shown in Fig. 3, they may be used to prevent any endwise motion of the coil and thus the coil will be supported in every direction.

My invention is particularly applicable to a railway motor, but it is evident to those skilled in the art that it may be used advantageously on any dynamo electric machine.

What I claim as new and desire to secure by Letters Patent of the United States is:

1. In combination with the frame of a dynamo electric machine, a field pole, a field coil therefor, and a resilient plate having two portions bent at an angle to each other, said portions engaging the sides of the coil so as to tend to press said coil away from said pole and toward said frame.

2. In combination with the frame of a dynamo electric machine, a field pole, a field coil therefor, and a resilient plate having two portions bent at an angle to each other, said portions engaging the sides of said coil so as to tend to press said coil away from said pole and toward said frame, one of said portions having its ends bent about said pole so as to keep said plate in place.

3. In combination with the frame of a dynamo electric machine, a field pole having a main portion and pole tips, a field coil therefor, and a resilient flanged plate tending to press said coil away from the main portion of the pole and also away from the pole tips toward said frame.

4. In combination with the frame of a dynamo electric machine, a field pole having a main portion and pole tips, a field coil therefor, and a resilient flanged plate tending to press said coil away from the main portion of the pole and also away from the pole tips toward said frame, the portion of said plate adjacent to the main portion of the pole having its ends bent about said pole so as to keep it in place.

5. In combination with the frame of a dynamo electric machine, a field pole having a main portion and pole tips, a field coil therefor, and a resilient plate having two portions bent at an angle to each other, said angle being less than 90 degrees, said plate tending to press said coil away from the main portion of the pole and also away from the pole tips toward said frame.

6. In combination with the frame of a dynamo electric machine, a field pole having a main portion and pole tips, a field coil therefor, and a resilient plate having two portions bent at an angle to each other, said angle being less than 90 degrees, said portion of the plate adjacent to the main portion of the pole having its ends bent about said pole, said plate tending to press said coil away from the main portion of the pole and also away from the pole tips toward said frame.

In witness whereof, I have hereunto set my hand this 10th day of August, 1910.

EDWARD D. PRIEST.

Witnesses:
BENJAMIN B. HULL,
HELEN ORFORD.